United States Patent Office 3,238,220
Patented Mar. 1, 1966

3,238,220
3-HYDROXY-BENZISOXAZOLES AND THEIR PRODUCTION
Horst Boshagen, Haan, Rhineland, Germany, assignor to Farbenfabriken Bayer Aktiengesellschaft, Leverkusen, Germany, a corporation of Germany
No Drawing. Filed Dec. 18, 1962, Ser. No. 245,401
Claims priority, application Germany, Dec. 20, 1961,
F 35,602
18 Claims. (Cl. 260—307)

The present invention relates to 3-hydroxy-benzisoxazoles, the production thereof and pharmaceutical and plant-protective compositions containing the same.

Only three compounds have been referred to in the literature as possible 3-hydroxy-benziosxazoles. H. Lindemann and H. Cissee [A 469, 44 (1929); J. Pr. Chem. (2) 122, 231 (1929)] prepared two extremely readily decomposing compounds, which were thought to be the corresponding 3-hydroxy-benzisoxazoles, by the diazotization of 6-nitro- and 6-acetylamino-3-aminobenzisoxazole. Later, H. Freiser and J. L. Walter [J. Org. Chem. 18, 256 (1953)] obtained a substance, which was thought to be 5,7-dibromo-3-hydroxy-benzisoxazole, by the oxidative bromination of salicylamide. These reaction products do not agree, in respect of their chemical behavior and their physical data, with the extremely stable products newly synthesized according to the procedure described below and definitely identifiable as true 3-hydroxy-benzisoxazoles. The designation of the literature compounds as 3-hydroxy-benzisoxazoles has been definitely established as erroneous.

It has now been found that 3-hydroxy-benzisoxazoles can be obtained in good yield and practically free from isomers when 5-[2'-hydroxyphenyl]-1,3-dioxa-thiazoline-2,4-S-oxides, which may be substituted in the benzene nucleus, are cyclized at 0° C. to 35° C. either with ammonia or with an organic base, preferably triethylamine, or thermally at a temperature of 100° C. to 130° C. In the latter case, the 3-hydroxy-benzisoxazoles are obtained admixed with some benzoxazolones-2.

The preparation of the 5-[2'-hydroxyphenyl]-1,3-dioxa-thiazoline-2,4-S-oxides is carried out by reacting salicyl-hydroxamic acids with thionyl chloride. For further processing, it is not necessary to purify the cyclic sulfurous acid esters remaining after removal, by evaporation, of the solvent, but the crude product can at once be taken up in an inert reaction agent, for example, absolute dioxane, and decomposed by adding triethylamine dropwise. During this procedure, the reaction temperature must not exceed 35° C. The example set forth hereinafter in detail indicates the further processing.

The thermal decomposition of the 5-[2'-hydroxyphenyl]-1,3-dioxa-thiazoline-2,4-S-oxides is appropriately carried out on purified material. In order to moderate the reaction, which often proceeds explosively with elimination of sulfur dioxide, an inert diluent, for example quartz sand, has to be added. The decomposition temperatures are between 100° C. and 130° C. The resultant mixture of isomers is separated by recrystallization.

The 3-hydroxy-benzisoxazoles thus obtained are extremely stable compounds with unique properties not comparable to any previously reported compounds. They produce a bright red coloration with ferric chloride in acetone and can be acylated and alkylated in a manner similar to phenols. The infrared and ultraviolet spectra differ characteristically from those of the isomeric benzoxazolones.

The reaction scheme may be illustrated as follows:

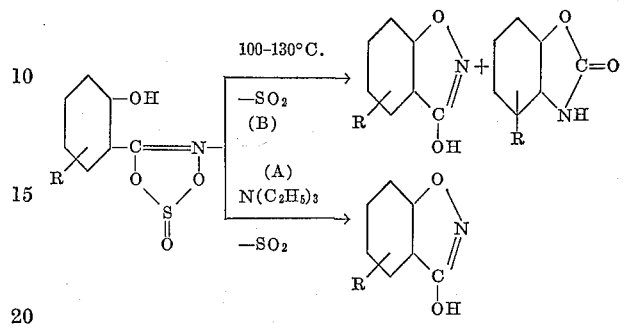

In the above reaction scheme, the benzene nucleus may be substituted with one or several residues R, where R represents halogen atoms, alkyl groups, alkoxy groups, alkylmercapto groups, or nitro groups. In addition, R may also denote a condensed aromatic ring.

The 3-hydroxy-benzisoxazoles produced possess valuable pharmaceutical properties, i.e., as oral fungistatics with an effect against Trichophyta and constitute intermediate products for agents by esterification of the hydroxyl group with the radicals of substituted phosphoric or thiophosphoric acids. The active plant-protective agent is formulated with a suitable carrier or vehicle into a composition suitable for administration or application.

*Example*

*Method A.*—22.2 grams (0.1 mole) of 3,5-dichlorosalicyl-hydroxamic acid are dissolved in 50 milliliters of absolute tetrahydrofurane, and 15 milliliters (0.2 mole) of thionyl chloride are then gradually added dropwise, with vigorous stirring. The temperature is maintained between 25° C. and 35° C. by occasional stirring. Subsequently, the solvent as well as excess thionyl chloride are removed by evaporation in vacuo. Bath temperature: 30° C. to 35° C.

The crystalline residue remaining in the flask is again dissolved in 50 milliliters of absolute benzene, for the removal of the thionyl chloride residues, and the solution is once more evaporated in vacuo. The crude crystalline 5-[2' - hydroxy - 3',5' - dichlorophenyl] - 1,3 - dioxathiazoline-2,4-S-oxide thus obtained is immediately dissolved in 50 milliliters of absolute dioxane, and 30 grams (0.3 mole) of triethylamine are then slowly added dropwise, with exclusion of moisture and with vigorous stirring. The temperature must not exceed 35° C. during this procedure. Thereafter, it is stirred for another fifteen minutes, and the reaction mixture is then taken up in 300 milliliters of water. Any impurities, which possibly occur to a small extent, are removed by extraction with ether. The clear aqueous solution is acidified with concentrated hydrochloric acid. The precipitating product is filtered off with suction, washed well with water, and dried. There are obtained 16.5 grams, i.e. 81 percent of the theoretical yield, of 5,7-dichloro-3-hydroxybenzisoxazole which, after crystallization from methanol, is in the form of colorless small leaves of melting point 227° C. (subl.).

*Method B.*—The cyclic sulfurous acid ester is prepared from 22.2 grams (0.1 mole) of 3,5-dichloro-salicylhydroxamic acid and 15 milliliters (0.2 mole) of thionyl chloride, as described in Method A, and the crude product is recrystallized from benzene/petroleum ether. There are obtained about 17.5 grams, i.e., 65 percent of the theoretical yield, of 5-[2'-hydroxy-3',5'-dichlorophenyl]-1,3-dioxa-thiazoline-2,4-S-oxide as colorless small needles, which melt at 90° C. to 95° C. with evolution of gas, then solidify again, and become liquid again at 155° C. to 165° C.

10.0 grams of the 5-[2'-hydroxy-3',5'-dichloro-phenyl]-1,3-dioxa-thiazoline-2,4-S-oxide are mixed with an equal amount of quartz sand, and the mixture is gradually heated in vacuo to 100° C. to 120° C. (bath temperature). At this temperature, decomposition starts with the elimination of sulfur dioxide. After reaction, the resultant mass is eluted with acetone, the solvent is evaporated off on a water bath, and the crude product, which consists of about equal parts of 5,7-dichlorobenzoxazolone-2 and 5,7-dichloro-3-hydroxy-benzisoxazole, according to infrared spectra, is recrystallized from methanol (ten times) until the melting point has risen to 227° C. There are obtained about 2 grams, i.e. 26.5 percent of the theoretical, of 5,7-dichloro-3-hydroxy-benzisoxazole, as colorless small leaves.

The compounds listed below were obtained from the corresponding salicyl-hydroxamic acids according to Method A. The percentages recited indicate the yields.

All melting points were determined by means of a melting point microscope.

*3-hydroxy-benzisoxazole.*—The compound, after recrystallization from 33 percent methanol, forms colorless prismatic needles of melting point 143° C. (subl.). (58 percent.)

*5-chloro-3-hydroxy-benzisoxazole.* — Colorless small needles of melting point 215° C. (subl.). (67 percent), from methanol.

*6 - chloro - 3 - hydroxy - benzisoxazole.*—Colorless prisms of melting point 217.5° C. (subl.). (70 percent), after recrystallization from methanol.

The above compound was prepared from 4-chloro-salicylhydroxamic acid; colorless rectangular small leaves of melting point 227° C. (decomp.). (Dioxane.)

*5,7 - dibromo - 3 - hydroxy - benzisoxazole.*—Fine colorless small needles, after recrystallization from ethanol. Melting point 245.5° C. (subl.). (71 percent; 36 percent.)

*5,7 - diiodo - 3 - hydroxy - benzisoxazole.*—Slightly yellowish small needles, after recrystallization from dioxane, of melting point 265° C. (subl.). (65 percent; 21 percent.)

*5 - nitro - 3 - hydroxy - benzisoxazole.*—When recrystallized from 50 percent methanol, the substance forms shiny, yellowish small leaves of melting point 202° C. (subl.). (70 percent.)

*6-nitro-3-hydroxy-benzisoxazole.*—Yellow short coarse prisms, from methanol or acetonitrile, of melting point 223.5° C. (subl.). (62 percent.)

*7 - methoxy - 3 - hydroxy - benzisoxazole.*—Colorless interlocked small needles, after recrystallization from methanol, of melting point 203° C. (subl.). (54.5 percent.)

*6-methoxy-3-hydroxy-benzisoxazole.*—From methanol, colorless prisms of melting point 209° C. (subl.) (55.5 percent.)

The above compound as prepared from 4-methoxy-salicylhydroxamic acid is in the form of colorless prisms of melting point 199° C. (decomp.). (Methanol.)

*7-methyl-3-hydroxy - benzisoxazole.*—Recrystallization from 33 percent methanol gives colorless prisms of melting point 161.5° C. (subl.). (65 percent.)

*6-methyl-3-hydroxy-benzisoxazole.*—After recrystallization from 33 percent methanol, the compound forms colorless prisms of melting point 154.5° C. (subl.). (56 percent.)

*5-tert.butyl-3-hydroxy-benzisoxazole.*—Colorless coarse prisms of melting point 166.5° C. (subl.) obtained upon recrystallization from methanol. (65.5 percent.)

The compound was obtained from 5-tert.butyl-salicyl-hydroxamic acid as colorless rhombic crystals of melting point 171° C. (decomp.), from dilute methanol.

*5-methylmercapto-3-hydroxy - benzisoxazole.*—Recrystallization from 50 percent methanol gives yellowish prisms of melting point 147° C. (subl.). (50 percent.)

The compound was prepared from 5-methylmercapto-salicyl-hydroxamic acid. Melting point 187° C. (decomp.). Shiny small leaves, from methanol.

*5,6-benzo-3-hydroxy - benzisoxazole.*—After recrystallization from glacial acetic acid, the substance forms yellowish prisms of melting point 234° C. (subl.). (75 percent.)

What is claimed is:
1. A compound selected from the group consisting of 3-hydroxy-benzisoxazole and its halo, nitro, lower alkoxy, lower alkyl, lower alkylmercapto and benzo substituted derivatives.
2. 3-hydroxy-benzisoxazole.
3. 5-chloro-3-hydroxy-benzisoxazole.
4. 6-chloro-3-hydroxy-benzisoxazole.
5. 5,7-dichloro-3-hydroxy-benzisoxazole.
6. 5,7-dibromo-3-hydroxy-benzisoxazole.
7. 5,7-diiodo-3-hydroxy-benzisoxazole.
8. 5-nitro-3-hydroxy-benzisoxazole.
9. 6-nitro-3-hydroxy-benzisoxazole.
10. 6-methoxy-3-hydroxy-benzisoxazole.
11. 7-methoxy-3-hydroxy-benzisoxazole.
12. 6-methyl-3-hydroxy-benzisoxazole.
13. 7-methyl-3-hydroxy-benzisoxazole.
14. 5-tert.butyl-3-hydroxy-benzisoxazole.
15. 5-methylmercapto-3-hydroxy-benzisoxazole.
16. 5,6-benzo-3-hydroxy-benzisoxazole.
17. A process for the production of a compound selected from the group consisting of 3-hydroxy-benzisoxazole and its halo, nitro, lower alkoxy, lower alkyl, lower alkylmercapto and benzo substituted derivatives which comprises cyclizing a compound selected from the group consisting of 5-[2'-hydroxyphenyl]-1,3-dioxa-thiazoline-2,4-S-oxide, and its halo, nitro, lower alkoxy, lower alkyl, lower alkylmercapto and phenyl substituted derivatives at temperature of 0° C. to 35° C. with a nitrogen compound selected from the group consisting of ammonia and an organic amine base.
18. A process for the production of a compound selected from the group consisting of 3-hydroxy-benzisoxazole and its halo, nitro, lower alkoxy, lower alkyl, lower alkylmercapto and benzo substituted derivatives which comprises cyclizing a compound selected from the group consisting of 5-[2'-hydroxy-phenyl]-1,3-dioxa-thiazoline-2,4-S-oxide and its halo, nitro, lower alkoxy, lower alkyl, lower alkylmercapto and phenyl substituted derivatives thermally at a temperature of 100° C. to 130° C.

References Cited by the Examiner
UNITED STATES PATENTS

| | | | |
|---|---|---|---|
| 2,277,680 | 3/1942 | Bousquet | 167—33 |
| 2,358,402 | 9/1944 | Kurlychek | 167—33 |
| 2,870,015 | 1/1959 | Allen et al. | 260—304 |
| 2,922,794 | 1/1960 | Model et al. | 260—304 |
| 2,969,370 | 1/1961 | Britton et al. | 260—307 |
| 3,012,039 | 12/1961 | Morley et al. | 260—304 |
| 3,095,422 | 6/1963 | Duennenberger et al. | 260—307 |

(Other references on following page)

OTHER REFERENCES

Freiser et al., J. Org. Chem., vol. 18, pages 256–260 (1953).

Lindemann et al., J. Prakt. Chem., vol. 122, pages 232–260 (1929).

Lindemann et al., Ann. der Chemie, vol. 469, pages 44–57 (1929).

Lindemann et al., Ann. der Chemie, vol. 456, pages 284–311 (1927).

NICHOLAS S. RIZZO, *Primary Examiner.*